Sept. 25, 1951  J. W. FLUDE  2,568,851
DETECTOR CARRIER FOR SEISMIC EXPLORATION
Original Filed March 7, 1942

INVENTOR.
John W. Flude
BY Cousins & Cousins
ATTORNEYS,

Patented Sept. 25, 1951

2,568,851

UNITED STATES PATENT OFFICE 2,568,851

DETECTOR CARRIER FOR SEISMIC EXPLORATION

John W. Flude, Houston, Tex.

Application March 7, 1942, Serial No. 433,731, now Patent No. 2,423,591, dated July 8, 1947, which is a division of Serial No. 295,198, September 16, 1939, now Patent No. 2,283,200, dated May 19, 1942. Divided and this application Serial No. 747,947, May 14, 1947

2 Claims. (Cl. 177—352)

This invention relates to detector carriers for seismographic exploration and is a division of co-pending application Serial No. 433,731, filed March 7, 1942, now Patent No. 2,423,591, dated July 8, 1947, which application is in turn a division of a prior co-pending application Serial No. 295,198, filed September 16, 1939, now Patent No. 2,283,200, dated May 19, 1942.

In the art of underseas surveying, fully described in U. S. Patent 2,283,200, it is necessary to provide apparatus for carrying and substantially automatically positioning seismic detectors upon the ocean floor. Moreover, it has been found desirable to use a plurality of such detectors incorporated into a tow which may be drawn through the water between recordings.

Accordingly, it is an object of this invention to provide a detector carrier which may be towed either over land or under water during the seismic surveying.

Another object of this invention is to provide a detector carrier which may be incorporated into a tow comprising a plurality of similar carriers.

A further object of this invention is to provide a detector carrier which will maintain the detector in an upright position upon the ocean bottom.

A feature of this invention is its capsule shape which enables it to pass over land or through water with a minimum of resistance.

Another feature of this invention is its novel construction whereby the detector may be easily inserted or removed for servicing by removing a single screw.

A further feature of this invention is its novel construction whereby the water tightness of the carrier is insured.

The invention consists of the construction, combination and arrangement of parts, as herein illustrated, described and claimed.

In the accompanying drawings, forming part hereof, is illustrated one form of embodiment of the invention, in which drawings similar reference characters designate corresponding parts, and in which.

Figure 1:
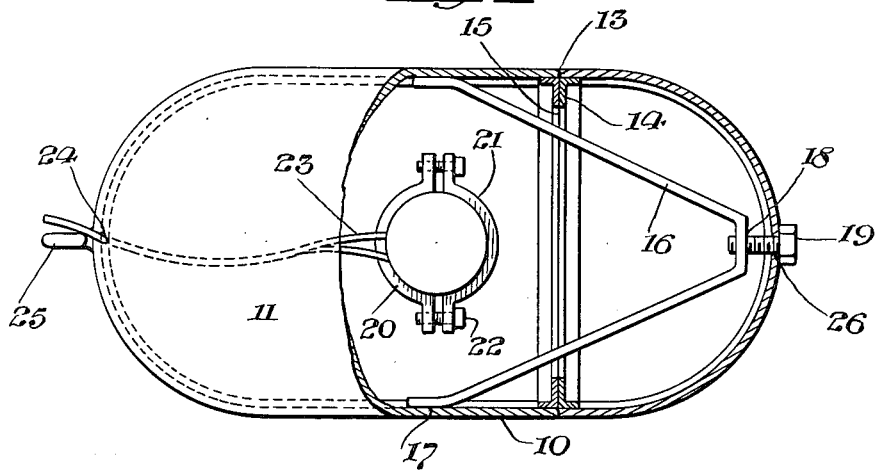
Figure 1 is a plan view of the detector carrier, with certain parts cut away to show the internal construction.
Figure 2:
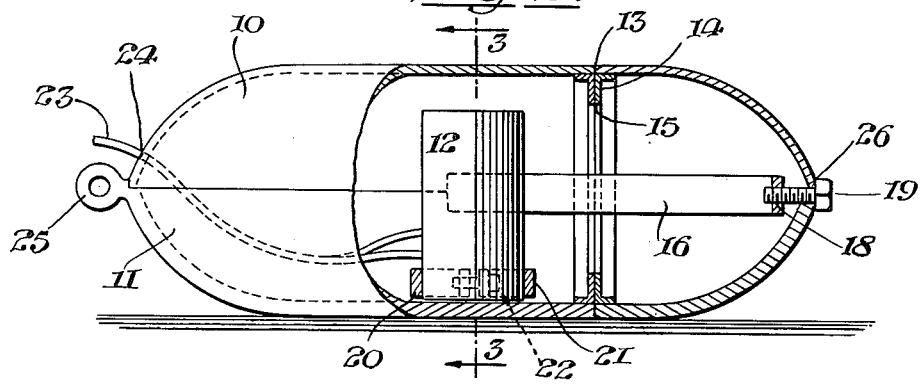
Figure 2 is a side elevation of the carrier, with certain parts shown in section.
Figure 3:
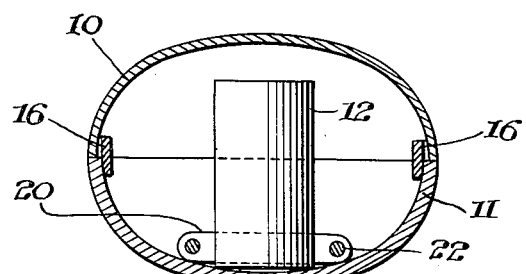
Figure 3 is a cross-sectional view, taken on line 3—3 of Figure 2, as indicated by the arrows.

Referring to the drawings, there is shown a form of detector carrier constructed in a generally capsule shape and consisting of cup halves 10—11. The said cup halves 10—11 are placed one upon the other and welded together. The respective halves 10—11 of the shell are preferably formed of strong, relatively heavy metal, the lower half 11 being twice as thick as the upper half 10, so that it acts somewhat as a keel. This construction insures the travel of the shell, so as to maintain the seismic detector 12 in an upright position. The capsule may be cut adjacent its rear end, as at 13, and the interior surface adjacent the said cut 13 provided with angle members 14 securely welded to the forward and rear portions of the separate parts formed by the cut 13. The faces of the angle members 14 are preferably abutted one against the other, and pins (not shown) may be provided extending outwardly from one face into identically positioned apertures in the opposing face in order to insure their proper registration.

A substantially V-shaped bar 16 may be welded to the foremost section of the capsule, as at 17. The apex portion of the said bar 16 is bored and tapped at 18, to receive a holding means such as a bolt 19, which may be an eyebolt if more than one carrier of this type is to be towed in series. When the two sections of the capsule are placed in proper alignment, the bolt 19 may be extended through the rear end of the shell and screwed into the V-shaped member 16, in order to hold the two sections together. The rearmost section of the capsule is pierced at 26 to allow the said bolt 19 to pass therethrough.

On the base or lower cup member 11 is secured a semi-circular collar segment 20 having a co-operating or complementary collar segment 21 loosely associated therewith as by bolts 22. A detector 12 placed within the collar members 20, 21 may be firmly held in position by taking up on the bolts 22. Wires 23 may be extended through the aperture 24 in the frame end of the capsule to the detector 12. An eyebolt 25 is secured to the front of the capsule. When the detector carrier as shown is used, a cable (not shown) is attached to the eye 25 as by a clevis, and the wires 23 either secured to the outside of the cable or connected to conductors therewithin, in order that the electrical impulses, which are generated by the detector 12 when in position to detect ground motion, may be carried to the amplifying and recording system of the seismograph (not shown).

It will be seen from the drawings that the end of the capsule may be removed from the carrier, by merely unscrewing the one bolt 19. This enables the operator to open the capsule and renders the detector 12 easily accessible.

Moreover, the water-tightness of the said capsule is insured by the mere tightening of the one bolt 19. This construction greatly facilitates the use and operation of the above described carrier for seismographic surveying.

Having thus fully described the invention, what is claimed as new and desired to be secured by Letters Patent of the United States, is:

1. A detector carrier for seismic exploration, comprising a capsule shaped casing formed from two cup shaped halves, the lower of said halves being substantially heavier than the upper, a holder for a seismic detector on the lower of said halves for supporting the seismic detector upright in said casing with the lower end thereof in said holder and the upper end thereof extending into the upper half, the weight of the lower half of the casing with respect to the combined weight of the upper half of the casing and the weight of the detector being such as to maintain the seismic detector in an upright position in the casing and an eye at the forward end of said casing to receive a towing cable.

2. A detector carrier for seismic exploration, comprising a capsule shaped casing formed from two cup shaped halves, the lower of said halves being substantially heavier than the upper, a removable cap member at the rear of the cup shaped halves, a substantially V-shaped bar within the casing attached to one of the cup shaped halves by the legs of the V, said bar being engageable at its apex with the cap member by a bolt insertable through the said cap member, a holder for a seismic detector on the lower of said halves for supporting the seismic detector upright in said casing with the lower end thereof in said holder and the upper end thereof extending into the upper half, the weight of the lower half of the casing with respect to the combined weight of the upper half of the casing and the weight of the detector being such as to maintain the seismic detector in an upright position in the casing, an opening in the said casing adapted to receive a wire, said wire being connected to the detector and an eye at the forward end of the casing to which a towing cable may be attached.

JOHN W. FLUDE.

REFERENCES CITED

The following references are of record in the file of this patent:

UNITED STATES PATENTS

| Number | Name | Date |
| --- | --- | --- |
| 1,320,610 | Elia | Nov. 4, 1919 |
| 1,470,733 | Hayes | Oct. 16, 1923 |
| 2,191,121 | Slichter | Feb. 20, 1940 |